No. 764,808. Patented July 12, 1904.

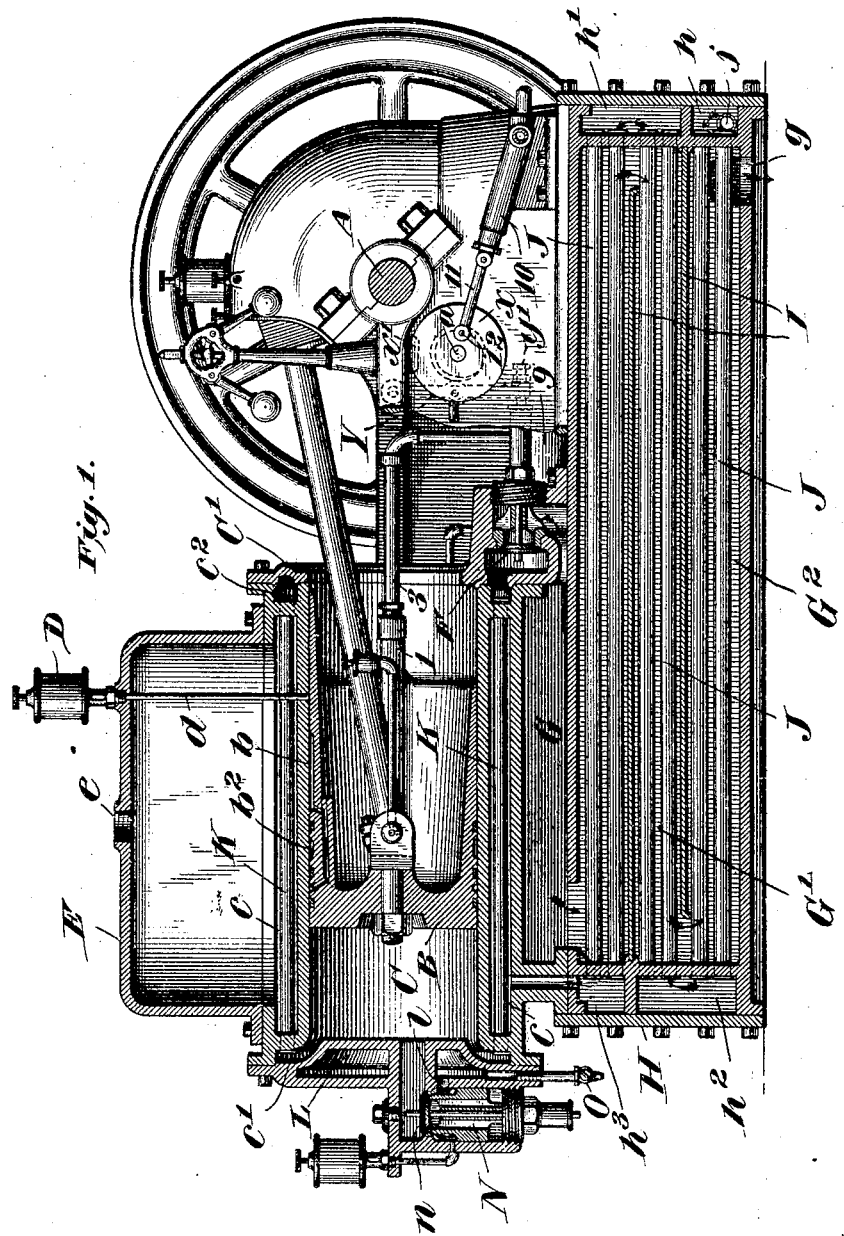

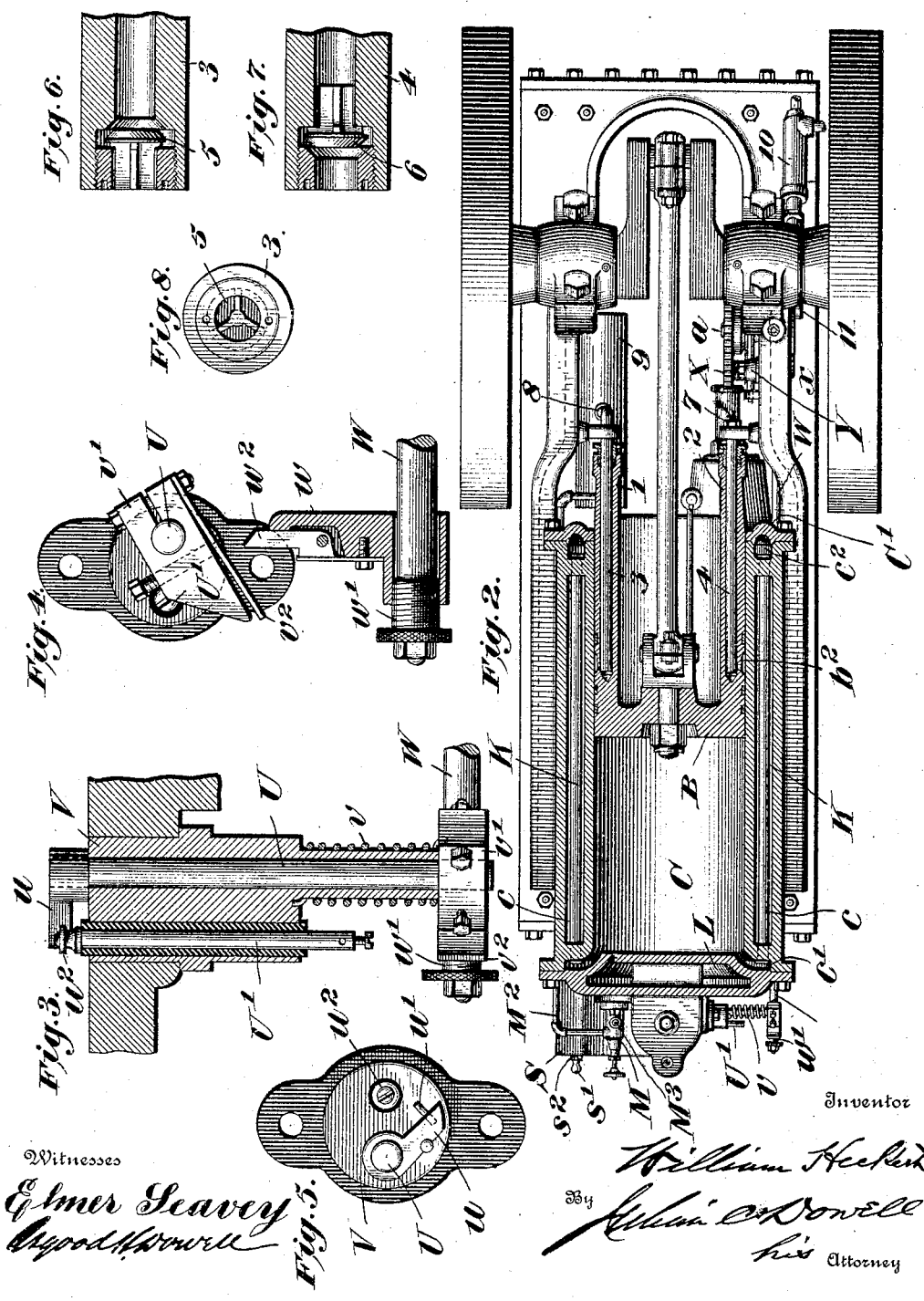

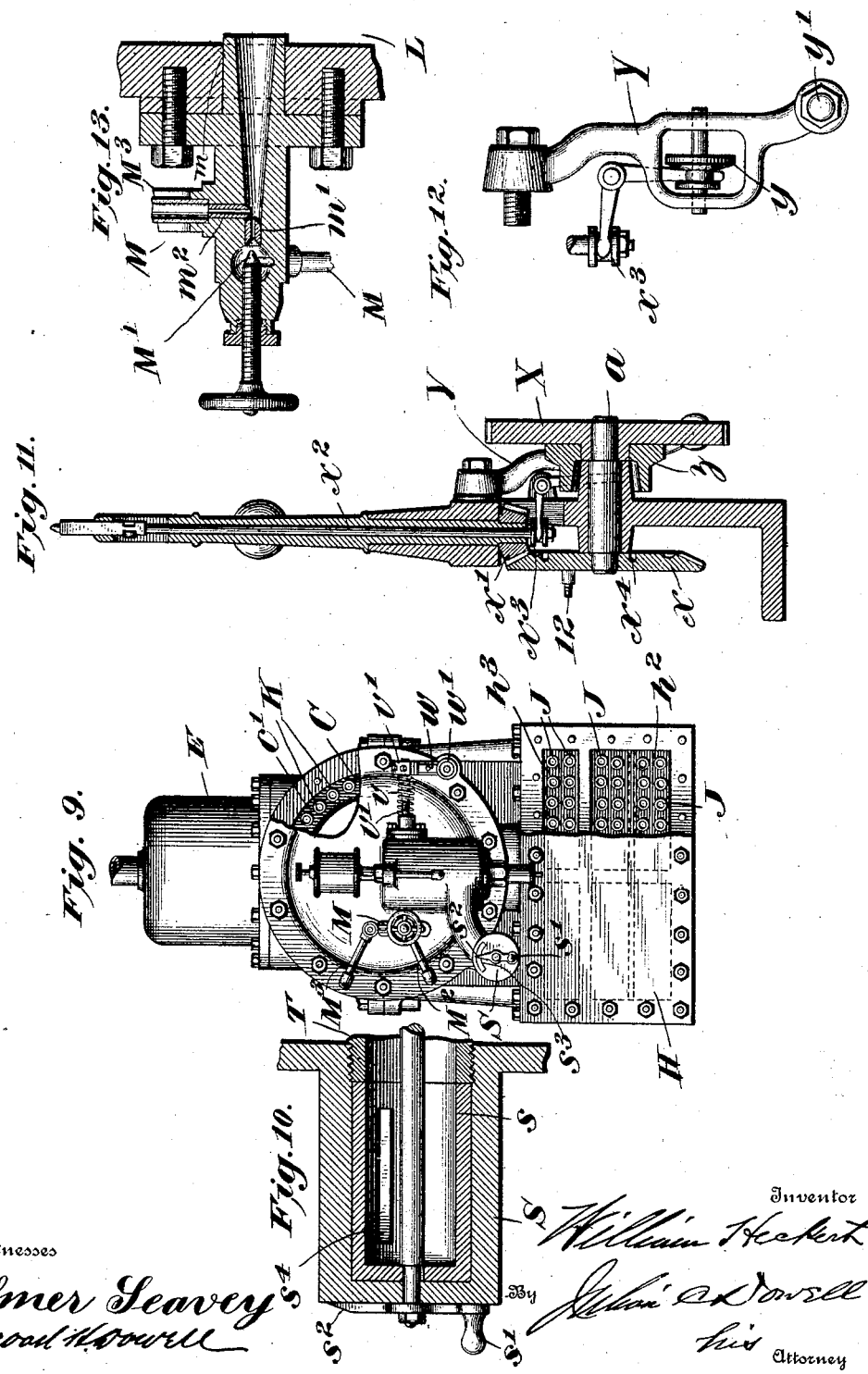

UNITED STATES PATENT OFFICE.

WILLIAM HECKERT, OF FINDLAY, OHIO, ASSIGNOR OF ONE-HALF TO HENRY W. SENEY, OF TOLEDO, OHIO.

HOT-WATER AND STEAM HEATING ENGINE.

SPECIFICATION forming part of Letters Patent No. 764,808, dated July 12, 1904.

Application filed June 13, 1902. Serial No. 111,537. (No model.)

*To all whom it may concern:*

Be it known that I, WILLIAM HECKERT, a citizen of the United States, residing at Findlay, in the county of Hancock and State of Ohio, have invented certain new and useful Improvements in Hot-Water and Steam Heating Engines; and I do hereby declare the following to be a full, clear, and exact description of the invention, such as will enable others skilled in the art to which it appertains to make and use the same.

This invention relates to heating engines or machines for steam-generating and steam and hot-water heating purposes as distinguished from engines in which the heat is utilized primarily for obtaining the greatest possible power.

The principal object of the invention is to provide an improved gas-engine with means for utilizing in the most efficient manner the heat and force of explosion and products of combustion for water-heating and steam-generating, as well as similarly utilizing the residues of heat and the waste or exhaust products of combustion. The engine is of course also applicable to other uses, and when used as a power apparatus the steam generated thereby may be used, in combination with the explosive gases, as one of the motive forces for actuating the piston by providing a suitable arrangement for admitting gas and steam to opposite sides of the piston, as shown and described in my former Letters Patent for combined gas and steam engine, No. 708,637, dated September 9, 1902.

The invention will first be hereinafter more particularly described with reference to the accompanying drawings, which form a part of this specification, and then pointed out in the claims following the description, similar letters of reference being used in the drawings to denote similar parts in the different views.

In said drawings, Figure 1 is a longitudinal vertical sectional view of an engine embodying one form of my invention. Fig. 2 is a sectional plan view thereof, showing the piston-cylinder and its surrounding water-jacket in horizontal section. Figs. 3, 4, and 5 are detail views, on an enlarged scale, of the igniter. Figs. 6 and 7 are detail sectional views of the valves of the piston-actuated air-pump. Fig. 8 is an end view of one of the hollow valved piston-rods of said air-pump. Fig. 9 is a front end elevation of the engine, parts thereof being broken away to show the interior construction. Fig. 10 is a detail sectional view of the air-valve for regulating the supply of air to the gas-generating chamber. Fig. 11 is a detail sectional view of the governor and its driving mechanism. Fig. 12 is a detail view of the depending swinging lever and connections with the governor through which the exhaust-valve is actuated to control the speed of the engine, and Fig. 13 is a detail sectional view of the oil feeding and atomizing device.

The letter A in the drawings denotes an ordinary crank-shaft mounted on a suitable bed-frame and having a fly-wheel or wheels thereon and a rod connecting the crank on said shaft with a piston B. The piston is adapted to work within the open-ended cylinder C, to which a reciprocatory movement is imparted by the explosion of gases in the combustion-chamber of said cylinder, as will be presently explained. The piston B may be of any suitable construction, but is preferably provided with an oil-duct $b$ in its periphery leading to an annular groove or recess $b^2$ around its periphery between a pair of packing-rings thereon, said duct $b$ being in communication with an oil-tube $d$, so that when the piston moves back its full stroke a small quantity of oil will enter said duct for lubricating the piston. The tube $d$ may be supplied with oil from a cup D on the steam dome or chest E or other suitable portion of the engine. The cylinder C is provided with a water-space $c$ around the same, opening into the steam-dome E, which is provided with an outlet-opening $e$, to which may be connected a pipe or any suitable means for conducting steam from said dome to any suitable apparatus in which the steam is to be used for heating or other purposes. The cylinder C at the front or gas end thereof is provided with an annular air-space $c'$, opening into the combustion-chamber formed within the cylinder at said end, and is provided at the opposite end thereof with an air-space $c^2$, which may be conveniently formed by confronting recesses in the end of the cylinder and the inner surface of the rear cylinder-head or annulus C', taking the place of the usual head, the said air-space $c^2$ forming a fire-flue which leads through an exhaust-valve F to a subjacent or lower series of heat or fire flues G G' $G^2$ for conducting the residues of heat and waste products of combustion downwardly around or through an ascending water-passage for heating an ascending column of water. Said descending exhaust-passage may be formed by providing a tube-chamber H with return-heads at the ends thereof having upper and lower compartments therein and baffle-plates or partitions I, which project alternately from opposite interior walls thereof nearly its entire length, as shown, so as to provide a series of heat or fire flues forming a zigzag or serpentine passage descending step by step from the exhaust-valve F to an outlet $g$ at the lowest point of the circuit, a series of pipes J being arranged in each section or division of said descending heat-passage in such manner that a lower compartment, as $h$, of the return-head at one end of the casing H is connected with an upper compartment, as $h'$, therein through a lower compartment, as $h^2$, of the return-head at the opposite end of the casing, while the latter compartment is connected with an upper compartment, as $h^3$, in the latter return-head through an upper compartment in the return-head at the opposite end of the casing, thereby forming a zigzag or serpentine passage or conduit leading upwardly from the inlet $j$ through the fire-flues of the descending heat-passage to the water-space $c$ around the cylinder. It may be desirable in some instances to reverse the described arrangement—that is, to utilize the pipes to form a heat-passage descending through instead of around the pipes forming the water-passage, which is an obvious modification of the described construction. The air-space $c'$ at the front or gas end of the cylinder C is open to the interior of said cylinder to provide a free exhaust-passage around the combustion-chamber into the open ends of a series of fire-flues or tubes K, which connect said air-space with the air space or flue $c^2$ at the rear end of the cylinder. Thus the fire-flues which pass through the surrounding water-space open at their front ends into the combustion-chamber and practically form a part of the latter and receive a portion of the combustible charges. The object of this construction is to apply the highest temperature of the gases under the highest initial pressure of combustion in the fire-flues, as well as in the explosive end of the cylinder, for under such condition of high pressure the heating capacity of the gases is much higher than under ordinary pressure at the same temperature, and it is estimated that the transmission of heat from the flues in which such gases are introduced at their highest temperature and pressure is over forty times more per square foot of heating-surface than that from the flues of the best known boilers. The greater part of the heat of the gases is thus utilized in heating the water and generating steam, while a certain percentage of heat is transformed into mechanical energy for driving the engine.

For charging the gas end of the cylinder or combustion-chamber therein with a suitable mixture of gas and air the front cylinder-head may be provided, by casting or otherwise, with a generating-chamber L, to which a supply of gas or atomized crude oil or naphtha may be admitted through any suitable feeding device, though I preferably employ an oil feeding and atomizing device M, Figs. 2, 9, and 13, operating in conjunction with air and gas mixing devices, whereby crude oil may be atomized and injected into the gas-generating chamber, wherein by reason of the intense heat to which it is exposed it is vaporized and passes thence into a mixing-chamber to be commingled with air and then passed into the combustion-chamber for producing an explosion. The gas-generating chamber L has a port $l$ leading into the mixing-chamber N, from which the commingled gas and air passes through a mixing-valve $n$ into the combustion-chamber, wherein it is compressed on the return or reverse stroke of the piston and exploded by means of a suitable igniter, a preferred form of which is illustrated in detail, on an enlarged scale, in Figs. 3, 4, and 5. Any suitable air and gas mixing devices may be employed. As such devices do not *per se* form a part of my present invention, they are not specifically described herein. The form shown is similar to the construction shown in my patent numbered 425,132, dated April 8, 1890. The said oil feeding and atomizing device M may consist of a tubular body $m$, bolted or otherwise secured to the cylinder-head at the gas end of the engine and having a conical bore opening into the generating-chamber and provided with two nozzles $m'$ and $m^2$, which are inserted in suitable apertures therein at an angle to each other, one of which nozzles, as $m'$, is provided with an adjustable needle-valve M' and is in communication with a feed-pipe $M^2$, leading to an air-reservoir or other suitable source of compressed air, while the other nozzle, $m^2$, communicates with a feed-pipe $M^3$, leading to an oil-reservoir or any suitable supply of gas or oil. By such construction crude oil or naphtha introduced through the pipe $M^3$ and nozzle $m^2$ is intercepted by a jet of air issuing through the valve M' and nozzle $m'$, whereby it is atomized and then passes into the gas-generating chamber L. A waste valve or cock O is placed beneath the generating-chamber L for the removal of tar or other waste material resulting from the generation of gas in said chamber.

For regulating the admission of air for admixture with the gas or vapor issuing from the generating-chamber I may provide a hollow projection or horn, Figs. 9 and 10, extending out from the cylinder head or casing of the mixing-chamber N and uniting with a hollow boss S on or secured to the cylinder-head and having an aperture in the end thereof through which passes a stud projecting from one end of a rotary or oscillating valve $s$, said stud having a handle $s'$ and a pointer $s^2$, operating in connection with an index $s^3$, for adjusting and indicating the position of the port or posts $s^4$ in said valve, registering with a similar port in the boss S, for controlling the admission of air through said ports into the mixing-chamber. A pipe extension T may be screwed into the boss S with its rear end open to the outer air at a point below the piston-cylinder, so as to receive heated air and conduct the same into the mixing-chamber for commingling with the heated gases issuing from the gas-generating chamber, or the air may be drawn directly into the rear open end of the boss.

The igniting device (shown in detail in Figs. 3, 4, and 5) is designed to be automatically actuated in such manner as to produce an electric spark in, or in a channel leading into, the explosion or combustion chamber for igniting the explosive gases therein either at the instant the crank is on a dead-center or immediately before or after passing said center, according to the position of the actuating device when properly adjusted to effect the desired operation. In the form shown the igniter comprises a rotatably-supported rod or pole-piece U in electrical connection with one pole of a battery and a rod or pole-piece U' in electrical connection with the other pole thereof and insulated from the rod U, the latter having a contact-finger $u$ thereon, carrying, preferably, a platinum pin, as at $u'$, adapted to be moved into contact with a platinum or other suitable button $u^2$ on the pole-piece U'. The said rods U and U' are fitted in a suitably-apertured body V, bolted or otherwise detachably secured in an aperture provided therefor in the cylinder head or casing of the mixing-chamber, as shown in Fig. 3. A coiled or other suitable spring $v$, having one end fixed to said apertured body and the other end secured to a clamp $v'$ on the outer end of the rod U, tends to normally turn said rod into position to break the electric circuit and hold it open, with the projecting end of the clamp $v'$ thereon in the path of a tripping device $w$, adjustably secured to a reciprocating rod W for closing the circuit at the proper time, a forward-and-back or reciprocatory movement being imparted to said rod W by means of a pin on said rod engaging an eccentric groove $x^4$ on a gear X on the stub-shaft $a$, operated from the crank-shaft A. The said reciprocating rod W, or a jointed extension thereof, fitted in suitable guides on the bed frame or cylinder, carries at its forward end said tripping device $w$, which may be adjustably secured to the rod by inserting the end of the latter through an opening in its base, which opening is interiorly screw-threaded to receive a threaded nut or adjusting device $w'$, by which the tripping device may be adjusted lengthwise of the rod, so as to effect the ignition of the explosive gases at an earlier or later period, according to the direction in which the nut is turned. The tripping device $w$ carries a spring-pressed pawl $w^2$, which in moving forward will engage the clamp $v'$ or an interposed spring $v^2$ thereon, and thereby impart a part revolution to the rod U, thus closing the electric circuit through the combustion-chamber or a duct leading thereto, and as the said tripping device continues its movement past the clamp $v'$ the latter will be disengaged and returned to its normal position by the recoil of the spring $v$, thus breaking the electric circuit and producing an electric spark by which the explosion is effected. The spring bearing on the pawl $w^2$ tends normally to hold it erect or in proper position for engaging the clamp $v'$ or the spring $v^2$ thereon; but on the reverse movement said pawl will yield and move inactively past the said clamp into position for again lifting or oscillating the latter on its return movement. The spring $v^2$ on the clamp $v'$ provides a yielding contact which prevents undue pressure and consequent injury to the platinum points or other parts of the igniting device and its actuating mechanism.

A governor of any suitable construction may be employed for regulating the admission of explosive gases and controlling the speed of the engine by holding the exhaust-valve open for a longer or shorter period, as may be desired, in case the speed of the engine is unduly increased. In the form shown an ordinary ball-governor mounted on the bed-frame is driven by a bevel wheel or pinion $x'$ on the governor-shaft engaging a bevel-gear $x$ on a stub or counter shaft $a$, which in turn is driven by a gear-wheel X, engaging a pinion or small gear-wheel on the crank-shaft A, by which one revolution will be imparted to the governor-shaft to two revolutions of the crank-shaft. A vertically-reciprocating rod $x^2$, connecting with the arms of the governor, carries a grooved wheel or device $x^3$ at its lower end, which groove receives one end of a bell-crank, the other arm of which works in a groove of a slidable friction device or roller $y$, secured to a swinging arm Y, the free end of which carries an adjustable push-piece $y'$, which is adapted to engage the stem of the exhaust-valve F and open the same against the pressure of the spring by which said valve is normally held to its seat.

The said friction-wheel $y$ engages a cam $z$ on the stub-shaft $a$ or the hub of the gear X, and said cam has its raised surface extended obliquely toward one side thereof away from that portion of the surface which operates the valve under normal conditions—that is, when the engine is running at its normal speed—in order that the exhaust-valve (which will be automatically opened and closed at predetermined intervals under normal conditions) may be kept open for a longer or shorter period, as may be desired, should the speed of the engine be unduly increased. This may be accomplished by the described or equivalent connections with the governor for shifting said friction device or roller, so as to cause the same to bear on said extended raised surface of the cam, and thereby hold the exhaust-valve open during a part or during the entire time of the succeeding charging period—that is, during the next backward stroke of the piston—in order that the admission of air and gases from the exhaust may prevent the air-valve from opening to permit the entrance of combustible gas or a full charge thereof until the speed of the engine is sufficiently reduced, the engine at such periods being partially charged with burned gases and a greater or less charge of combustible material, thus reducing the force of the explosion and regulating the speed of the engine. When the roller slips off the raised cam-surface, the exhaust is closed, and during the remainder of the charging period a stream of pure air and gas commingled in the desired proportions is drawn into the cylinder, and a charge of greater or less power is thereby obtained. For the purpose of utilizing the heat absorbed by said piston and cylinder in heating air to be used in the generation of explosive gases and at the same time cooling the piston and interior cylinder-surface I have provided a piston-actuated air-pump for causing a circulation of air around the piston in contact with the interior walls of the cylinder. To this end the piston is longitudinally bored or provided on opposite sides thereof with tubes 1 and 2 to receive hollow piston-rods 3 and 4, respectively, the latter each having one end fixed and extending thence through a stuffing-box in the tube or pump-barrel provided therefor in the piston. A check-valve 5, fitted in one of said piston-rods, opens inwardly or in the direction of the forward movement of the piston, and a similar valve 6 in the other piston-rod opens outwardly or in the direction of the backward movement of the piston, and the former rod is provided with an air-inlet, as at 7, while the latter is provided with an air-outlet, as at 8, leading to an air-reservoir 9, having a pipe connection with the air feeding and atomizing device for supplying heated air thereto. If desired, said pipe connection may lead into the mixing-chamber for supplying the same with heated air, thus adding to the hot-air supply. The longitudinal bores or tubes at opposite sides of the piston are provided one with an outlet and the other with an inlet port leading to a groove or channel connecting said ports around the piston in order that the air admitted at one side may circulate around the piston in contact with the hot interior walls of the cylinder and be forced out at the other side of the piston into the compressed-air reservoir 9. The piston-actuated air-pump as described operates on the principle of a suction and force pump—that is to say, on the forward movement of the piston a vacuum will be formed in the bore or tube, at the inlet side thereof, which will cause a suction of air into said tube, and on the reverse movement the check-valve in said tube will close, and the air will be forced through the outlet-port into and around the piston and cooling the cylinder-surface, and thence through the opposite port into the bore or tube at the opposite side of the piston and through the backwardly-opening valve and hollow piston-rod at that side out and into the air-reservoir.

For convenience in supplying feed-water a pump 10 may be mounted on the bed-frame with its plunger connected by a connecting-rod 11 with a crank-pin 12 on the gear-wheel X, which operates the governor.

As before stated, it may be desirable in some cases to actuate the piston by the combined action of steam and expansive gases, which may be accomplished by substituting another form of piston and providing a steam-chest and valve working therein operated in the usual way from the crank-shaft of the engine for the purpose of introducing steam through suitable pipes leading from the outlet from the steam-dome to said valve-chest and thence into the cylinder on that side of the piston opposite the explosion-chamber in the manner substantially as shown and described in my aforesaid Letters Patent, No. 708,637.

In operation the engine is started in the usual way, and as the piston recedes or moves backward an initial charge of mixed air and gas will be admitted to the piston-cylinder and compressed on the forward stroke and then exploded, forcing the piston back, and on the next forward movement the waste products of combustion are forced through the fire flues or tubes, which connect the air-space at the front of the cylinder with the air-space at the rear thereof, leading to the exhaust-valve and subjacent heat-flues. On the next backward stroke, the exhaust-valve being closed, a vacuum will be formed in the gas end of the cylinder, causing the air and gas inlet-valve to open, thereby again admitting a mixture of gas and air, which will be compressed on the next forward stroke and exploded at the proper time by means such as described or any suitable igniting devices, and so on, so as to impel the piston by the action of the expansive gases at every second backward stroke.

The gas generating and mixing apparatus, including the oil atomizing and injecting devices and the apparatus for heating air and supplying the same to the gas generating and mixing apparatus, are not specifically claimed *per se* herein, but are separately illustrated, described, and claimed in my copending application for patent for gas engine, Serial No. 157,608, filed May 18, 1903, as a division of the present application.

Having thus fully described my invention, what I claim as new, and desire to secure by Letters Patent of the United States, is—

1. The combination in a gas-engine of a cylinder having a surrounding water-space and air-spaces around its ends, one of said air-spaces having an unobstructed opening into the explosion-chamber of the cylinder, a series of fire-flues or tubes around the cylinder connecting said air-spaces through said water-space, a piston, and means for driving said piston by the action of expansive gases.

2. The combination in a gas-engine of a cylinder having a surrounding water-space and air-spaces around its ends, one of said air-spaces having an unobstructed opening into the cylinder, a series of fire-flues or tubes around the cylinder connecting said air-spaces through said water-space, a piston, means for driving said piston by the action of expansive gases, together with a subjacent series of fire-flues forming a zigzag descending heat-passage from the fire-flues around said cylinder, and a zigzag water-passage ascending through or around said heat-passage to said water-space.

3. The combination in a gas-engine of a cylinder having a surrounding water-space opening into a steam-dome at the top, an air-space around and opening into one end of said cylinder, an air-space around the opposite end of the cylinder leading to an exhaust-valve, and a series of tubes or fire-flues around the cylinder connecting said air-spaces through said water-space, a piston, and means for driving said piston by the action of expansive gases.

4. The combination in a gas-engine of a cylinder having a surrounding water-space opening into a steam-dome at the top, an air-space around and opening into one end of said cylinder, an air-space around the opposite end of the cylinder leading to an exhaust-valve, a series of tubes or fire-flues around the cylinder connecting said air-spaces through said water-space, a piston, and means for driving said piston by the action of expansive gases, together with a series of fire-flues below said cylinder forming a zigzag heat-passage descending from said exhaust-valve, and a water-passage ascending in a zigzag course through or around said heat-passage to said water-space.

5. The combination with the cylinder having a water-space around the same, of a series of fire-flues or tubes extending through said water-space and communicating at one end with the exhaust and at their other ends directly with the interior of the cylinder forming an explosion-chamber adjacent to said ends.

6. The combination with the cylinder having a water-space around the same, and a series of fire-flues or tubes extending through said water-space, of an air-space at one end of the cylinder leading from said tubes to the exhaust and an air-space at the other end of the cylinder affording direct communication therefrom into said fire-flues.

7. The combination with a gas-engine cylinder, having a piston therein, and means for introducing and igniting explosive charges in said cylinder, of a boiler having internal fire-flues having direct unobstructed communication with the explosion-chamber of said cylinder.

In testimony whereof I affix my signature in presence of witnesses.

WILLIAM HECKERT.

Witnesses:
ELMER SEAVEY,
OSGOOD H. DOWELL.